United States Patent
Sushita (10) Patent No.: US 10,586,123 B2
(45) Date of Patent: Mar. 10, 2020

(54) INDIVIDUAL IDENTIFICATION APPARATUS

(71) Applicant: Bionics Co., Ltd, Osaka-shi, Osaka (JP)

(72) Inventor: Kozo Sushita, Osaka (JP)

(73) Assignee: Bionics Co., Ltd, Osaka-shi (JP)

( * ) Notice: Subject to any disclaimer, the term of this patent is extended or adjusted under 35 U.S.C. 154(b) by 0 days.

(21) Appl. No.: 16/316,658

(22) PCT Filed: Jul. 10, 2017

(86) PCT No.: PCT/JP2017/025099
§ 371 (c)(1),
(2) Date: Jan. 10, 2019

(87) PCT Pub. No.: WO2018/012449
PCT Pub. Date: Jan. 18, 2018

(65) Prior Publication Data
US 2019/0294901 A1    Sep. 26, 2019

(30) Foreign Application Priority Data

Jul. 12, 2016  (JP) ................. 2016-137351

(51) Int. Cl.
*G06K 9/00* (2006.01)
*G06K 9/20* (2006.01)
(Continued)

(52) U.S. Cl.
CPC ..... *G06K 9/00892* (2013.01); *G06K 9/00288* (2013.01); *G06K 9/00912* (2013.01);
(Continued)

(58) Field of Classification Search
None
See application file for complete search history.

(56) References Cited

U.S. PATENT DOCUMENTS 7,856,558 B2 * 12/2010 Martin ............... G07C 9/00087
340/5.81
7,980,378 B2 *  7/2011 Jones ................. G06Q 20/1085
194/217
(Continued)

FOREIGN PATENT DOCUMENTS

JP      05-046743       2/1993
JP     2002-288671     10/2002
(Continued)

OTHER PUBLICATIONS

International Preliminary Report on Patentability for International Application No. PCT/JP2017/025099 dated Nov. 30, 2018, 5 pgs.
(Continued)

*Primary Examiner* — Soo Jin Park
(74) *Attorney, Agent, or Firm* — Amin, Turocy & Watson, LLP (57) ABSTRACT

Provided are a vehicle body assembling method and a vehicle body assembling apparatus which allow a simple configuration in the vicinity of the connecting portion between an upper jig and a lower jig and allow an increase in the efficiency of assembling work (welding work). A vehicle body assembling apparatus is equipped with a jig for supporting vehicle body components in a preassembled position, the jig comprising an upper jig and a lower jig which are connected to each other in at least two places. Each of the connection places is provided with a connecting means for fixing a three-dimensional coordinate position while allowing uniaxial turning. The vehicle body assembling apparatus is also equipped with a conveying means for conveying the upper jig which supports the vehicle body components, and reduces the load applied to the lower jig from the upper jig when connecting the upper jig to the lower jig.

5 Claims, 7 Drawing Sheets

(51) Int. Cl.
*H04N 5/225* (2006.01)
*G06T 1/00* (2006.01)
*G06T 7/00* (2017.01)

(52) U.S. Cl.
CPC .............. *G06K 9/2027* (2013.01); *G06T 1/00* (2013.01); *G06T 7/00* (2013.01); *H04N 5/2256* (2013.01); *G06K 2009/00932* (2013.01)

(56) References Cited

U.S. PATENT DOCUMENTS

| | | | | |
|---|---|---|---|---|
| 8,959,029 | B2* | 2/2015 | Jones | G06Q 20/1085 235/379 |
| 2002/0154793 | A1* | 10/2002 | Hillhouse | G06K 9/00087 382/115 |
| 2006/0090079 | A1* | 4/2006 | Oh | G07C 9/00087 713/186 |
| 2007/0075827 | A1* | 4/2007 | Itoh | G06F 21/32 340/5.53 |
| 2007/0092113 | A1* | 4/2007 | Yonaha | G06K 9/00013 382/115 |
| 2009/0320106 | A1* | 12/2009 | Jones | G06Q 20/1085 726/5 |
| 2014/0266604 | A1* | 9/2014 | Masood | G06K 9/00221 340/5.83 |
| 2015/0193669 | A1* | 7/2015 | Gu | G06K 9/46 348/77 |
| 2016/0239703 | A1* | 8/2016 | Park | G06K 9/00 |
| 2016/0247341 | A1* | 8/2016 | Talwerdi | B42D 9/04 |
| 2016/0292536 | A1* | 10/2016 | Irie | G06K 9/00288 |

FOREIGN PATENT DOCUMENTS

| | | |
|---|---|---|
| JP | 2004-46697 | 2/2004 |
| JP | 2005-92611 | 4/2005 |
| JP | 2006-252225 | 9/2006 |
| JP | 2013-117876 | 6/2013 |
| JP | 2015-11656 | 1/2015 |

OTHER PUBLICATIONS

International Search Report and Written Opinion for International Application No. PCT/JP2017/025099 dated Oct. 10, 2017, 10 pgs.
Chinese Office Action for Chinese Patent Application No. 201780043002.0 dated Jul. 16, 2019.

* cited by examiner

INDIVIDUAL IDENTIFICATION APPARATUS

TECHNICAL FIELD

The present invention relates to an individual identification apparatus that performs identity verification by means of both identification using finger vein patterns and identification using facial information, and more particularly to an individual identification apparatus capable of accurately verifying identity even when finger vein patterns or facial information changes due to aging of a test subject.

BACKGROUND ART

Vein patterns being biological information are in-vivo information, so that forgery thereof is difficult. In addition, the vein patterns are not determined by human genetic information (base sequences of DNA), so that even identical twins mutual with the same genetic information each have different vein patterns, thereby enabling discrimination therebetween. Thus, individual identification based on vein patterns has high identification accuracy.

Mechanism of individual identification based on finger vein patterns will be outlined. When a finger is irradiated with near-infrared rays, the near infrared rays passing through the inside of the finger are easily absorbed by hemoglobin flowing in finger veins. Because of this, when the finger is irradiated with near-infrared rays and light passing through the finger is imaged, finger vein patterns appear as black shadows. Thus, for identification, a reading unit images transmitted light through the finger, and a vein identification unit extracts vein patterns from imaging information. Then, the extracted vein patterns and vein patterns preliminarily recorded in the database (identification data) are compared with each other to perform individual identification.

In an individual identification apparatus based on vein patterns, a reading unit has an inner surface on which a specific person's finger is disposed and in which a light source such as a light emitting diode (LED) or the like is disposed, and another inner surface facing the LED in which a charge-coupled device (CCD) image sensor is disposed. Other than the CCD image sensor, a two-dimensional photosensor such as a complementary metal oxide semiconductor (CMOS) image sensor is available. The LED emits light and the light passes through a finger. Then, the CCD image sensor or the like captures a transmitted light image of vein patterns to convert it into a digital signal. When a database has corresponding identification data, the identity of the person is recognized.

Individual identification using facial information being biological information is usually performed by individuals in normal social life, and thus identification using facial information is a customary identification method. Meanwhile, undergoing facial identification enables a fraud user to be easily identified for unfair use, on the basis of facial information, and awareness that facial information may be recorded gives a psychological effect of preventing fraud to a test subject.

An individual identification apparatus based on facial information includes a camera for imaging a face, and a facial identification unit having a database for preliminarily recording facial identification data. When receiving imaging information from the camera, the facial identification unit extracts facial information from the imaging information and checks the extracted facial information with facial identification data to perform identity verification. Japanese Patent Application Laid-Open (JP-A) No. H05-46743 (Patent Literature 1) discloses a specific example of an individual identification apparatus based on facial information. The individual identification apparatus disclosed in Patent Literature 1 includes an image input unit (camera) that obtains imaging information of a face and gives the imaging information to a facial information extraction unit (feature point extraction unit). The facial information extraction unit extracts facial information (position information of feature points such as eyes, nose, mouth, etc.) from the imaging information. Meanwhile, a database preliminarily stores facial identification data (position information of feature points) of a test subject. Then, a difference detector obtains difference information from the facial information (coordinate values of respective feature points) extracted by the facial information extraction unit, and the facial identification data (coordinate values of respective feature points) stored in the database. Then, a processing unit performs individual identification on the basis of the difference information and the like.

CITATIONS LIST

Patent Literature

Patent Literature 1: Japanese Patent Application Laid-Open (JP-A) No. H05-46743

SUMMARY OF INVENTION

Technical Problems

Vein patterns and facial information, being biological information, may change over time due to aging. For example, aging of adults or growth of young people may cause vein patterns and facial information, being physical features, to be changed. In such a case, identification with the same reference value (threshold) may increase a probability that a person is wrongly identified (a false rejection rate: FRR) even though the person is the principal. In contrast, when a criterion value (threshold) is lowered to lower the false rejection rate, a probability that a person is identified as the principal (a false acceptance rate: FAR) is increased even though the person is a stranger. Thus, the false rejection rate and the false acceptance rate are generally in a trade-off relationship, so that pursuing one sacrifices the other.

It is an object of the present invention to provide an individual identification apparatus capable of simultaneously lowering both a false rejection rate and a false acceptance rate. It is another object of the present invention to provide an individual identification apparatus that can be continuously used for many years.

Solutions to Problems

An individual identification apparatus of the present invention includes vein pattern identification means for reading finger vein patterns to perform identity verification based on the finger vein patterns, and facial identification means for imaging a face with a camera to perform identity verification based on facial information, and determines that a person is a principal when the person is identified by both the vein pattern identification means and the facial identification means. The individual identification apparatus is configured such that a reading unit for reading the finger vein patterns and the camera for imaging the face are disposed adjacent to each other, and such that when a finger of the person is placed on the reading unit, the camera images the face of the person.

The vein pattern identification means includes a reading unit and a vein identification unit. The reading unit irradiates the finger with light to read the finger vein patterns, and images light passing through the finger. The vein identification unit has a database in which identification data on the finger vein patterns is recorded in advance. The vein identification unit is configured to be capable of receiving imaging information from the reading unit, and when receiving the imaging information from the reading unit, extracts vein patterns from the imaging information. Next, the vein identification unit retrieves identification data corresponding to the extracted vein patterns. When there is identification data with an agreement rate between the extracted vein patterns and the identification data on vein patterns, being equal to or more than a threshold value set lower than a threshold normally set in the vein pattern identification means, identity verification is achieved.

Meanwhile, the facial identification means includes the camera for imaging the face and a facial identification unit. The facial identification unit has a database in which facial identification data is recorded in advance. The facial identification unit is configured to be capable of receiving imaging information from the camera, and when receiving the imaging information from the camera, extracts facial information from the imaging information. Next, the facial identification unit retrieves identification data corresponding to the extracted facial information. When there is identification data with an agreement rate between the extracted facial information and the identification data on the face, being equal to or more than a threshold value set lower than a threshold normally set in the facial identification means, identity verification is achieved.

The individual identification apparatus of the present invention determines that the person is the principal when the person is identified by both the vein pattern identification means and the facial identification means. Thus, even when a threshold is set lower than a threshold normally set in the vein pattern identification means, and a threshold is set lower than a threshold normally set in the facial identification means, a false acceptance rate can be kept low. In addition, the threshold in each identification means is set lower than the threshold normally set. This enables the false rejection rate to be kept low even when vein patterns or facial information changes over time. Thus, even when vein patterns or facial information changes over time, the same individual identification apparatus can be continuously used for many years. When the vein patterns and facial information extracted at the time of identity verification achieved by both the vein pattern identification means and the facial identification means are additionally accumulated in the database, there is a preferable aspect of changing a setting value of a threshold for identification, for each person identified, on the basis of an agreement rate between data to be additionally accumulated in the database and the identification data to perform identity verification using the changed threshold. The amount of secular change of biological information is different depending on a test subject, so that performing identity verification with a threshold suitable for a test subject enables accurate individual identification to be performed.

It is preferable that the individual identification apparatus of the present invention is configured such that when the finger of the person is placed on the reading unit, a precaution for imaging is voice-guided before the camera images the face of the person. The voice guidance enables obtaining facial information that is liable to be compared with the identification data recorded in the database of the facial identification unit, so that an agreement rate with the facial identification data can be increased while correction is reduced. It is preferable to provide an illumination unit adjacently to the camera to allow the illumination unit to emit light in an imaging direction of the camera when the finger of the person is placed on the reading unit. The illumination unit enables clear imaging information to be obtained even in a dark atmosphere for imaging. In addition, the illumination unit is disposed adjacent to the camera and emits light in the imaging direction of the camera, so that imaging information free from shadows on a face of the person can be obtained, thereby enabling reduction in correction after imaging.

There is available an aspect of additionally accumulating the vein patterns extracted and the facial information extracted in the database when identity verification is achieved by both of the vein pattern identification means and the facial identification means. This aspect enables secular change of vein patterns and facial information of a test subject to be grasped. In this aspect, an aspect of deleting old data among data accumulated in the database is preferable in that processing capacity of the individual identification apparatus is enhanced by reducing the amount of data recorded in the database to reduce a load.

When information extracted at the time of identity verification achieved by both the vein pattern identification means and the facial identification means is additionally accumulated in the database, there is a preferable aspect of using updated accumulated data as the identification data. When biological information of a test subject is changed over time, performing identification on the basis of the changed biological information enables individual identification with higher accuracy. Using the updated data as the identification data allows the same test subject to be identified next time using the individual identification apparatus having obtained the updated data, so that deterioration in an identification rate due to difference of the identification apparatus can be reduced.

Advantageous Effects of Invention

The individual identification apparatus of the present invention enables a false acceptance rate to be kept low. Even when vein patterns or facial information, being biological information, changes over time, the false rejection rate can be kept low. Thus, even when the physical features such as vein patterns and facial information change due to aging of adults and growth of young people, the same individual identification apparatus can be continuously used for many years.

DESCRIPTION OF EMBODIMENTS

An individual identification apparatus of the present invention includes vein pattern identification means for reading finger vein patterns to perform identity verification based on the finger vein patterns, and facial identification means for imaging a face with a camera to perform identity verification based on the facial information. Individual identification is a process of checking and certifying that a test subject is the principal. The individual identification apparatus of the present invention determines that a person is the principal when the person is identified by both the vein pattern identification means and the facial identification means.

The vein pattern identification means includes a reading unit and a vein identification unit. The reading unit irradiates a finger with light to read vein patterns of the finger, and images light passing through the finger. The vein identification unit has a database in which identification data on the finger vein patterns is recorded in advance. The vein identification unit is configured to be capable of receiving imaging information from the reading unit, and when receiving the imaging information from the reading unit, extracts vein patterns from the imaging information. Next, identification data corresponding to the extracted vein patterns is retrieved. Then, when there is identification data with an agreement rate between the extracted vein patterns and the identification data on vein patterns, being equal to or more than a threshold value set lower than a threshold normally set in the vein pattern identification means, identity verification is achieved.

The threshold at the time of vein pattern identification is a value serving as a boundary between whether it is determined to be the principal and whether it is determined to be another person, on the basis of an agreement rate between the vein patterns extracted and the identification data on vein patterns. For example, the agreement rate of vein patterns that do not coincide at all is indicated as 0, and the agreement rate of the vein patterns that completely coincide is indicated as 1. The threshold set to 0.8 causes a person to be determined as the principal when an agreement rate between the vein patterns extracted and the identification data on vein patterns is 0.8 or more. The same applies to the threshold at the time of facial identification.

The individual identification apparatus is capable of preliminarily setting any threshold. When a security level is increased by lowering a probability (false acceptance rate) of identifying a person as the principal despite being another person, the threshold is set high. Meanwhile, when a probability (false rejection rate) of identifying a person as another person despite being the principal is lowered, the threshold is set low, and then the security level is lowered. The individual identification apparatus of the present invention retrieves identification data corresponding to the vein patterns extracted from the imaging information. When there is identification data with an agreement rate between the extracted vein patterns and the identification data on vein patterns, being equal to or more than a threshold value set lower than a threshold normally set in the vein pattern identification means, identity verification is achieved.

The facial identification means includes a camera for imaging a face and a facial identification unit. The facial identification unit has a database in which facial identification data is preliminarily recorded. The facial identification unit is configured to be capable of receiving imaging information from the camera, and when receiving the imaging information from the camera, extracts facial information from the imaging information. Next, identification data corresponding to the extracted facial information is retrieved. When there is identification data with an agreement rate between the facial information extracted and the identification data retrieved on faces, being equal to or more than a threshold value set lower than a threshold normally set in the facial identification means, identity verification is achieved.

The individual identification apparatus of the present invention includes a vein pattern identification means and a facial identification means, and determines that a person is the principal when the person is identified by both the vein pattern identification means and the facial identification means. That is, identity verification is achieved by the double identification mean on the basis of the two kinds of biological information. Thus, even when a threshold is set lower than a threshold normally set in the vein pattern identification means, and a threshold is set lower than a threshold normally set in the facial identification means, a false acceptance rate can be kept low. In addition, the threshold in each identification means is set lower than the threshold normally set. This enables the false rejection rate to be kept low even when vein patterns or facial information, being biological information, changes over time due to aging. Thus, even when the physical features such as vein patterns and facial information change due to aging of adults and growth of young people, the same individual identification apparatus can be continuously used for many years.

Figure 4:
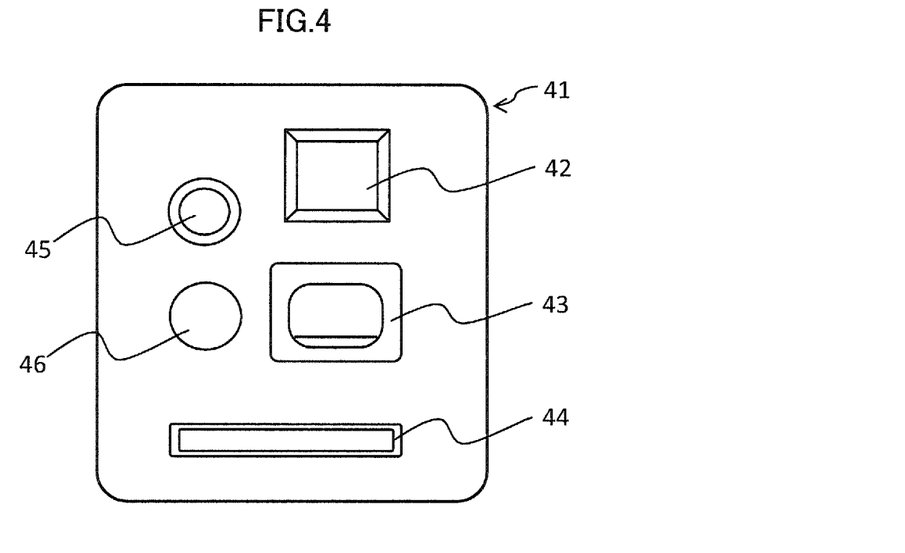
FIG. 4 is a front view illustrating an operation panel of the individual identification apparatus of the present invention.

FIG. 4 is a front view illustrating an operation panel of the individual identification apparatus of the present invention. As illustrated in FIG. 4, an operation panel 41 is configured such that a reading unit 43 for reading finger vein patterns and a camera 46 for imaging a face are disposed adjacent to each other, and such that when a finger of a person is placed on the reading unit 43, camera 46 images a face of the person. The operation panel further includes an illumination unit 45, a speaker 42, and an IC card insertion port 44. When a test subject turns its face, blinks, or the like during imaging for the facial identification, identification accuracy decreases to require correction of facial information after the imaging. The same is true when imaging atmosphere is dark, and the test subject wears a hat or glasses.

Operation panel 41 illustrated in FIG. 4 is configured such that the reading unit and the camera are disposed adjacent to each other, and when a finger of a person is placed on the reading unit, the camera images a face of the person. When a test subject places its finger on reading unit 43, the test subject pays attention to reading unit 43 and points its face toward the reading unit. Thus, disposing camera 46 adjacently to reading unit 43 enables the face of the test subject to be imaged from the front. This enables reduction in correction of turning imaging information. In addition, the test subject concentrates on placing its finger on reading unit 43, so that the face without blinking can be imaged. This enables reduction in correction of blinking, and enables increase in an agreement rate with the facial identification data. In addition, using an auto focus camera as camera 46 enables a clear captured image to be obtained regardless of a length of the arm of the test subject.

When a finger of a test subject is placed on reading unit 43, camera 46 images the face of the test subject. The placement of the finger and the imaging may be performed at the same timing, or the imaging timing can be arbitrarily set such that the imaging is performed after elapse of five seconds after the placement of the finger, for example. The finger can be detected in the reading unit such that two conductive members are disposed at respective position away from each other in reading unit 43 to measure electrostatic capacitance when the finger is placed on the two conductive members, for example. In addition, the finger in the reading unit can be detected by a temperature sensor or the like.

The operation panel illustrated in FIG. 4 includes an illumination unit 45 adjacent to camera 46 to allow illumination unit 45 to emit light in an imaging direction of camera 46 when a finger of a person is placed on reading unit 43. This enables clear imaging information to be obtained even in a dark atmosphere for imaging. In addition, illumination unit 45 is disposed adjacent to camera 46 and emits light in the imaging direction of camera 46, so that imaging information free from shadows on a face of the person can be obtained. This enables reduction in correction of brightness and shadow of facial information, and enables increase in an agreement rate with the facial identification data. While illumination timing can be arbitrarily set according to imaging timing, an aspect of setting illumination time to one to three seconds is preferable. Setting the illumination time to one to three seconds enables imaging to be performed again when imaging information is inappropriate for identification. In addition, obtaining a plurality of images within the illumination time enables a more appropriate image to be selected at the time of identification.

It is preferable that operation panel 41 exemplified in FIG. 4 includes speaker 42 with which, when a finger of a person is placed on reading unit 43, precautions for imaging is voice-guided before the camera images a face of the person. The voice guidance enables obtaining facial information that is liable to be compared with the identification data recorded in the database of the facial identification unit, so that an agreement rate with the facial identification data can be increased while correction is reduced. The precautions include the following, for example:

"Please ready for photographing your face in five seconds";

"Please remove hats and glasses."

"Please stand by following the indications under your feet and look straight to the place indicating a camera";

"Please keep a bland expression on your face"; and

"Please do not blink during photographing".

Figure 1:
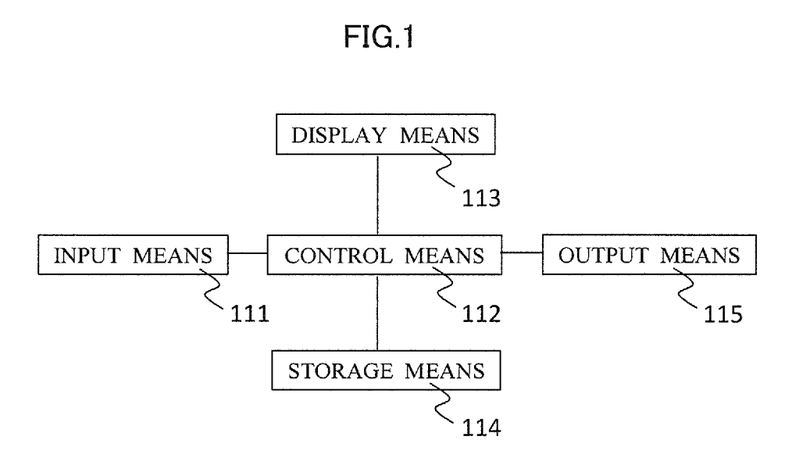
FIG. 1 is a conceptual diagram illustrating functions of an individual identification apparatus of the present invention.

FIG. 1 is a conceptual diagram illustrating functions of an individual identification apparatus of the present invention. In FIG. 1, input means 111 includes a reading unit that reads finger vein patterns and a camera that images a face, and obtains imaging information of the finger and the face to input imaging information. Input means 111 receives identification data with a CD-ROM or the like. Control means 112 allows storage means 114 to record identification data and the like received from input means 111. Display means 113 displays the recorded information and the like on a display as necessary. Meanwhile, output means 115 transmits a result of individual identification to the outside of the individual identification apparatus, for example.

Figure 2:
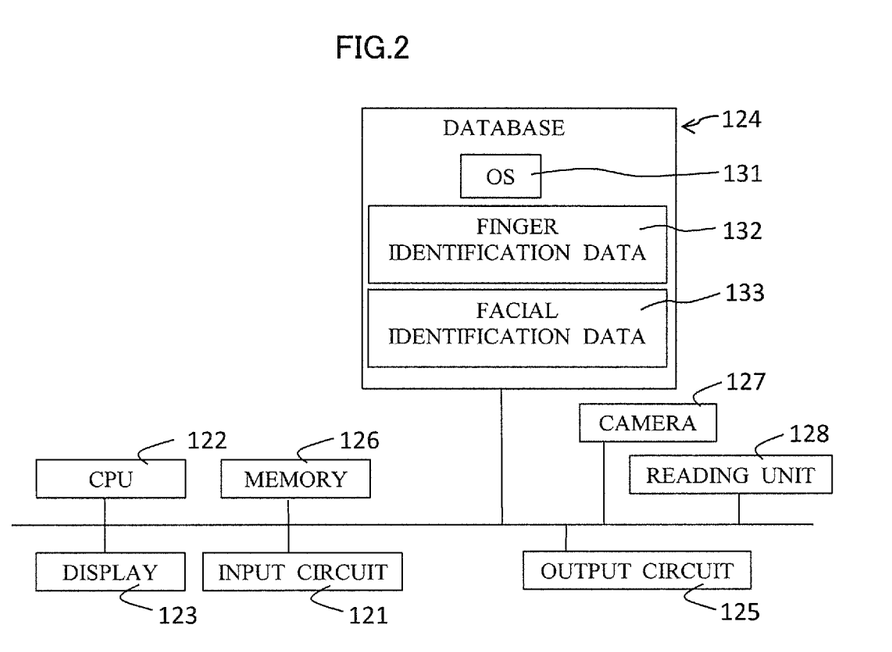
FIG. 2 is an explanatory diagram exemplifying a hardware configuration of the individual identification apparatus of the present invention.

FIG. 2 is an explanatory diagram exemplifying a hardware configuration of the individual identification apparatus of the present invention. In FIG. 2, a central processing unit (CPU) 122 is the control means, and an input circuit 121, a camera 127, and a reading unit 128 constitute the input means. A database 124 is the storage means and stores finger identification data 132 necessary for individual identification based on vein patterns, facial identification data 133 necessary for individual identification based on facial information, an operating system (OS) 131, and the like. A display 123 is the display means, and an output circuit 125 is the output means. As illustrated in FIG. 2, CPU 122, a memory 126, camera 127, reading unit 128, database 124, and the like are connected to each other, and the hardware works together to perform individual identification.

CPU 122 executes individual identification according to a program recorded in memory 126. In the individual identification apparatus exemplified in FIG. 2, when identity verification is achieved on the basis of finger vein patterns, reading unit 128 obtains and inputs imaging information of a finger of a test subject, and then CPU 122 allows memory 126 to store the input imaging information. Next, CPU 122 extracts vein patterns from the imaging information recorded in memory 126, and allows memory 126 to record the extracted vein patterns. CPU 122 also obtains finger identification data 132 from database 124 and allows memory 126 to record finger identification data 132. Subsequently, CPU 122 retrieves the finger identification data, and when there is identification data with an agreement rate between the vein patterns extracted from the imaging information and the finger identification data, being equal to or more than a predetermined threshold, the test subject is identified as the principal.

In the individual identification apparatus exemplified in FIG. 2, when identity verification is achieved on the basis of facial information, camera 127 obtains and inputs imaging information of the face of a test subject, and then CPU 122 allows memory 126 to store the input imaging information. Next, CPU 122 extracts facial information from the imaging information recorded in memory 126, and allows memory 126 to record the extracted facial information. CPU 122 also obtains facial identification data 133 from database 124 and allows memory 126 to record facial identification data 133. Subsequently, CPU 122 retrieves the facial identification data, and when there is identification data with an agreement rate between the facial information extracted from the imaging information and the facial identification data, being equal to or more than a predetermined threshold, the test subject is identified as the principal.

Figure 3:
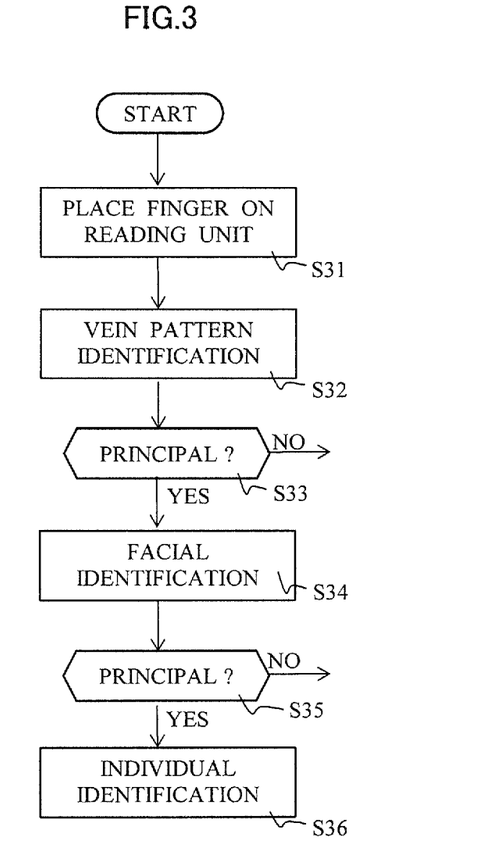
FIG. 3 is a flowchart by which the individual identification apparatus of the present invention operates.

FIG. 3 is a flowchart by which the individual identification apparatus of the present invention operates. As exemplified in FIG. 3, when a finger of a test subject is placed on the reading unit of the individual identification apparatus (step S31), finger vein patterns are first read and the vein pattern identification is executed (step S32). It is checked whether the test subject is the principal on the basis of the finger vein patterns (step S33). When identity verification cannot be achieved, it is determined that the test subject is not the principal, and the identification flow is ended. When the test subject is identified as the principal, facial identification is subsequently executed (step S34). It is checked whether the test subject is the principal on the basis of the facial information (step S35). When identity verification cannot be achieved, it is determined that the test subject is not the principal, and the identification flow is ended. Meanwhile, when the test subject is also identified as the principal by the facial identification, the test subject is identified as the principal (step S36).

Figure 6:
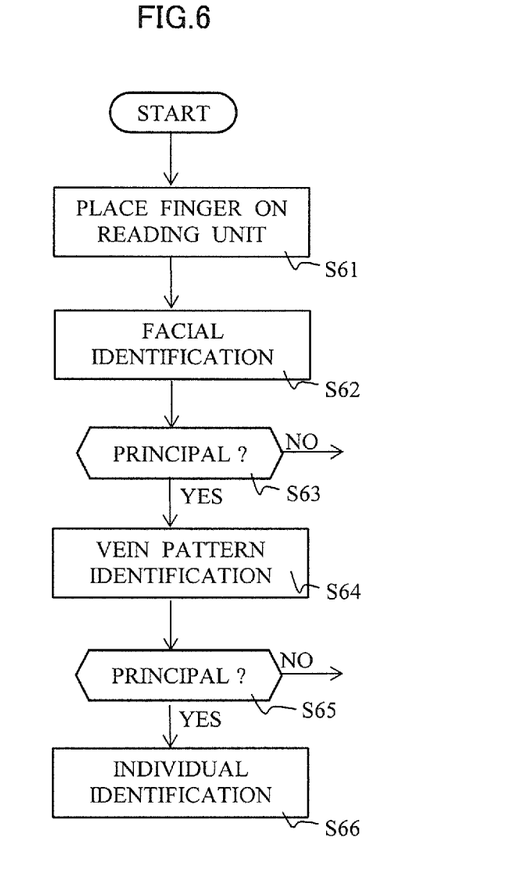
FIG. 6 is a flowchart of another aspect by which the individual identification apparatus of the present invention operates.

FIG. 6 is a flowchart of another aspect by which the individual identification apparatus of the present invention operates. As exemplified in FIG. 6, when a finger of a test subject is placed on the reading unit of the individual identification apparatus (step S61), the face of the subject is first imaged and the facial identification is executed (step S62). It is checked whether the test subject is the principal on the basis of the facial information (step S63). When identity verification cannot be achieved, it is determined that the test subject is not the principal, and the identification flow is ended. When the test subject is identified as the principal, the vein pattern identification is subsequently executed (step S64). It is checked whether the test subject is the principal on the basis of finger vein patterns (step S65). When identity verification cannot be achieved, it is determined that the test subject is not the principal, and the identification flow is ended. Meanwhile, when the test subject is also identified as the principal by the vein pattern identification, the test subject is identified as the principal (step S66).

Figure 7:
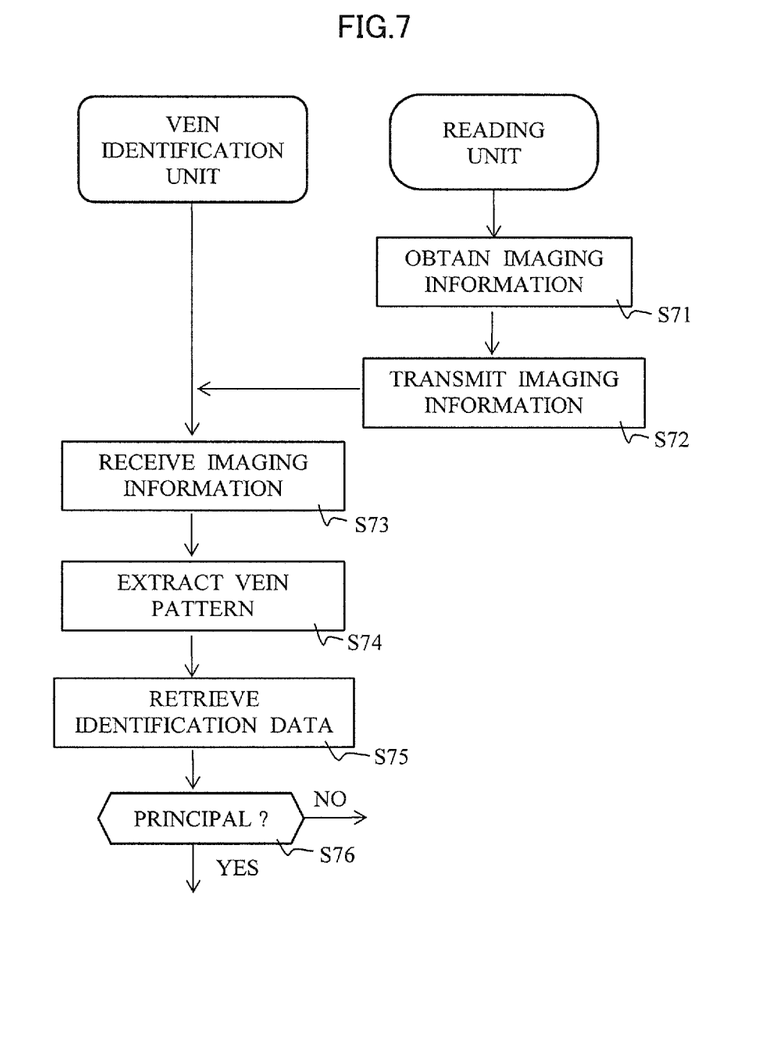
FIG. 7 is a flowchart of vein pattern identification in the individual identification apparatus of the present invention.

FIG. 7 is a flowchart of the vein pattern identification in the individual identification apparatus of the present invention. As exemplified in FIG. 7, the reading unit first obtains imaging information of a finger of a test subject (step S71), and transmits the obtained imaging information to the vein identification unit (step S72). The vein identification unit is configured to be capable of receiving imaging information from the reading unit. When the vein identification unit receives the imaging information (step S73), the CPU allows the memory to record the imaging information. Subsequently, the CPU extracts vein patterns from the imaging information (step S74), and allows the memory to record the extracted vein patterns.

The vein patterns are extracted from the imaging information by a method of iteratively performing tracking of a dark line, a method of emphasizing a pattern by filtering, or the like. For example, in the method of iteratively performing tracking of a dark line, hemoglobin constituting an erythrocyte flowing through a vein has a property of absorbing near-infrared rays, so that the vein is expressed as a dark line with luminance lower than that of its periphery in a captured image of a finger of the test subject. Thus, the vein patterns are extracted from the captured image by tracking from an arbitrary point therein for each pixel along the dark line until the dark line cannot be detected. This operation is repeated, and the number of traces per pixel is recorded. After that, vein regions and background regions are labeled to extract vein patterns. Meanwhile, in the method of emphasizing a pattern by filtering, contrast is emphasized after the imaging information is filtered, and a feature of vein patterns is extracted.

Then, as illustrated in FIG. 7, the vein identification unit retrieves identification data corresponding to the extracted vein patterns (step S75), and when there is corresponding identification data, the test subject is identified as the principal (step S76). The fact that there is the corresponding identification data means that there is identification data with an agreement rate between the extracted vein patterns and the identification data on vein patterns, being equal to or more than a threshold value set lower than a threshold normally set in the vein pattern identification means. In this case, the test subject is identified as the principal on the basis of the vein patterns (step S76).

The corresponding identification data is retrieved (step S75) by causing the CPU to access the database and obtain the identification data preliminarily recorded in the database. Next, the identification data is recorded in the memory, and identification data corresponding to the extracted vein patterns is retrieved from among the recorded identification data. When there is no identification data corresponding to the extracted vein patterns, the test subject is not identified as the principal, and then the individual identification flow is ended.

The vein pattern extracted by the method of tracking of a dark line or the like is checked against the identification data by a template matching method, for example. First, binary coded processing is applied to the extracted vein pattern image to emphasize the vein patterns. Next, corresponding pixel values are compared between the image subjected to the binary coded processing and the identification data to calculate an agreement rate. The agreement rate is a ratio of the number of pixels having the corresponding pixel values to the total number of pixels. When the agreement rate is equal to or more than a predetermined threshold, the test subject is identified as the principal. When individual identification is performed, a shift of a finger position varies the agreement rate between the extracted vein patterns and the identification data. For this reason, the checking is performed multiple times to calculate the agreement rate for each time, and a maximum value of the agreement rates can be used for the checking. Applying space compaction processing to the extracted vein pattern image after being subjected to the binary coded processing is preferable in that processing speed can be increased.

Figure 5:
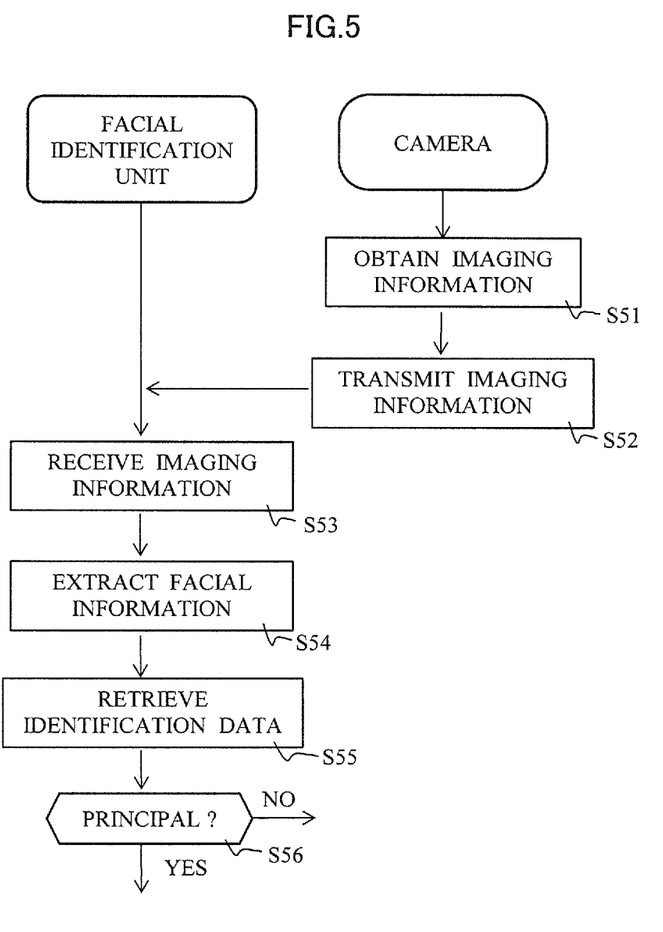
FIG. 5 is a flowchart of facial identification in the individual identification apparatus of the present invention.

FIG. 5 is a flowchart of the facial identification in the individual identification apparatus of the present invention. As exemplified in FIG. 5, the camera first obtains imaging information of the face of a test subject (step S51), and transmits the obtained imaging information to the facial identification unit (step S52). The facial identification unit is configured to be capable of receiving imaging information from the camera. When the facial identification unit receives the imaging information (step S53), the CPU allows the memory to record the imaging information. Subsequently, the CPU extracts facial information from the imaging information (step S54), and allows the memory to record the extracted facial information.

When the imaging information is not appropriate for identification, the camera obtains imaging information of the face again, and the obtained imaging information is subjected to processing similar to the above. In addition, there is available an aspect in which a plurality of imaging information items is obtained at a time and appropriate information is selected from the plurality of imaging information items. For extraction of facial information from imaging information, a publicly known technique for extracting feature data of a face of a test subject is available. That is, the face is divided into key parts (eye, nose, mouth, cheek, etc.) of how the face looks so that local features of the respective key parts are extracted instead of a feature of the entire face. At the time of identification, each of the local features is compared with identification data, and compared results are combined to identify the entire face.

First, the facial identification unit converts the received imaging information with A/D conversion, and applies correction such as enlargement and rotation to the imaging information as necessary. The facial identification unit extracts a contour of the face using luminance information and the like, and applies binary coded processing or the like to the imaging information to extract local features (position data) of an eye, a nose, and the like. When identification is performed by this method, local feature data of the face is preliminarily recorded in the database as identification data.

Then, as illustrated in FIG. 5, the facial identification unit retrieves identification data corresponding to the extracted facial information (step S55), and when there is corresponding identification data, the test subject is identified as the principal (step S56). The fact that there is the corresponding identification data means that there is identification data with an agreement rate between the extracted facial information and the facial identification data, being equal to or more than a threshold value set lower than a threshold normally set in the facial identification means. In this case, the test subject is identified as the principal on the basis of the facial information (step S56). There is available a method of identifying a registrant holding identification data showing a maximum agreement rate with the extracted facial information as the principal.

The corresponding identification data is retrieved (step S55) by causing the CPU to access the database and obtain the facial identification data preliminarily recorded in the database. Next, the facial identification data is recorded in the memory, and identification data corresponding to the extracted facial information is retrieved from among the recorded facial identification data. When there is no identification data corresponding to the extracted facial information, the test subject is not identified as the principal, and then the individual identification flow is ended.

Table 1 is an example of the database in the individual identification apparatus of the present invention. As shown in Table 1, finger identification data related to vein patterns of a finger of a subject and facial identification data related to facial information are recorded in the database, and an index is given to each test subject. The identification data shown in Table 1 is preliminarily input to the database using an optical disk, a magnetic disk, or the like. In addition, vein patterns and facial information can be extracted from imaging information on a specific person obtained by the reading unit or the camera, and the extracted information can be preliminarily registered in the database as identification data. This aspect is preferable in that the individual identification apparatus at the time of registering data on the specific person is the same as the individual identification apparatus at the time of identifying the same specific person, so that correction of rotating a face, correction of enlarging or contracting a face based on an arm length, and the like, can be reduced.

TABLE 1

| Index | Test subject | Finger identification data | Facial identification data |
|---|---|---|---|
| a | Mother | ... | ... |
| b | Father | ... | ... |
| c | Grandfather | ... | ... |
| d | Aya (child) | ... | ... |

There is an aspect of additionally accumulating vein patterns extracted and facial information extracted in the database when identity verification is achieved by both of the vein pattern identification means and the facial identification means. This aspect is preferable in that secular change of biological information (vein patterns and facial information) in a test subject can be grasped. In this aspect, an aspect of deleting old data among data accumulated in the database is preferable in that processing capacity of the individual identification apparatus is enhanced by reducing the amount of data recorded in the database to reduce a load.

When vein patterns and facial information, extracted at the time of identity verification achieved by both the vein pattern identification means and the facial identification means, are additionally accumulated in the database, there is a preferable aspect of using updated accumulated data as the identification data. The individual identification apparatus is used to perform identity verification of s test subject, so that when biological information of the test subject changes over time, performing identification on the basis of the changing biological information (updated data) enables individual identification with higher accuracy. Using the updated data as the identification data allows the same test subject to be identified next time using the individual identification apparatus having acquired the updated data (identification data), so that deterioration in an identification rate due to difference of the identification apparatus can be reduced.

When the vein patterns and facial information extracted at the time of identity verification achieved by both the vein pattern identification means and the facial identification means are additionally accumulated in the database, there is a preferable aspect of changing a setting value of a threshold for identification on the basis of an agreement rate between data to be additionally accumulated in the database and the identification data to perform identity verification using the changed threshold. The amount of secular change of biological information is different depending on a test subject, so that performing identity verification with a threshold suitable for a test subject enables accurate individual identification to be performed as compared with when the same threshold is applied to all test subjects regardless of difference in the amount of secular change thereof.

For example, an aspect having a low agreement rate between the data additionally accumulated in the database and the identification data, due to fast growth of a child, is assumed in the case of Aya in Table 1. Meanwhile, an aspect having a high agreement rate between the data additionally accumulated in the database and the identification data, due to a small amount of secular change of biological information, is assumed in the case of the grandfather in Table 1. Thus, when it is assumed that an agreement rate between the data additionally accumulated in the database and the identification data is 0.8 and a threshold initially set is 0.75 in the case of Aya (child), there is a preferable aspect of changing a setting value of the threshold at the time of identification to 0.7, for example, to perform identity verification using the changed threshold. Meanwhile, when it is assumed that an agreement rate between the data additionally accumulated in the database and the identification data is 0.9 in the case of the grandfather, there is a preferable aspect of changing a threshold of 0.75 initially set to a threshold of 0.8, for example, to perform identity verification using the changed threshold.

To change a threshold set for vein patterns, the vein identification unit records the extracted vein patterns in the database when both the vein pattern identification means and the facial identification means achieve identity verification. Next, the CPU calculates a difference between an agreement rate between data to be recorded in the database and the identification data, and a set threshold (e.g., 0.75), according to a program recorded in the memory. When the calculated value is equal to or less than a predetermined value A (e.g., 0.05), the CPU reduces the setting value (e.g., 0.75) of the threshold at the time of identification by a predetermined amount B (e.g., 0.05). Meanwhile, when the calculation value is more than a predetermined value C (e.g., 0.10), the CPU increases the setting value of the threshold at the time of identification by a predetermined amount D (e.g., 0.05). After that, the changed threshold is recorded in the database, and identity verification is achieved using the changed threshold. At the time of identification, the CPU obtains the changed threshold recorded in the database to allow the memory to record the obtained threshold, and then identification is performed.

This method is applied to the examples of Aya (child) and the grandfather. In the case of Aya, when it is assumed that an agreement rate between the data to be recorded in the database and the identification data is 0.8 and the set threshold is 0.75, a difference (0.05) between them is equal to or less than the predetermined value A (e.g., 0.05). Thus, the setting value of the threshold at the time of identification is reduced by the predetermined amount B (e.g., 0.05), so that the changed threshold becomes 0.7. In the case of the grandfather, when it is assumed that an agreement rate between the data to be recorded in the database and the identification data is 0.9 and the set threshold is 0.75, a difference (0.15) between them is more than the predetermined value C (e.g., 0.10). Thus, the setting value of the threshold at the time of identification is increased by the predetermined amount D (e.g., 0.05), so that the changed threshold becomes 0.8.

The same is true when a set threshold for facial information is changed. When both the vein pattern identification means and the facial identification means achieve identity verification, the facial identification unit records the extracted facial information in the database. Next, the CPU calculates a difference between an agreement rate between data to be recorded in the database and the identification data, and a set threshold, according to a program recorded in the memory. When the calculated value is equal to or less than a predetermined value E, the CPU reduces the setting value of the threshold at the time of identification by a predetermined amount F Meanwhile, when the calculation value is more than a predetermined value G, the CPU increases the setting value of the threshold at the time of identification by a predetermined amount H. After that, the changed threshold is recorded in the database, and identity verification is achieved using the changed threshold.

Using the indexes shown in Table 1 has the following advantages. When individual identification is performed, an index is preliminarily input. When retrieving identification data corresponding to extracted vein patterns, the CPU accesses the database to obtain identification data including the index, and allows the memory to record the identification data. Next, the CPU retrieves the index of the identification data on the basis of the index entered before the identification to obtain the finger identification data having the same index. Then the CPU compares the obtained finger identification data with the extracted vein pattern to perform individual identification. This aspect is preferable in that efficiency of individual identification can be improved. The same also applies to facial identification.

The index can be input by inputting card information using IC card insertion port 44 of the operation panel illustrated in FIG. 4, for example. In addition, the index can be input by inputting an individual identification number, a password, or the like for specifying a test subject with a keyboard or a touch panel provided in the operation panel.

The index in the identification data specifies the index of a test subject on the basis of the finger identification data specified by the vein pattern identification at the time of facial identification after identity verification by the vein pattern identification, for example. Next, specifying the facial identification data having the same index enables the facial identification to be efficiently performed using the obtained facial identification data. The same is true when the vein pattern identification is performed after identity verification by the facial identification.

An aspect of notifying completion after individual identification is completed is preferable in that the completion of the identification can be objectively checked. As notifying means, there are available a voice notification of "identity verification has been completed", a notification by melody such as a chime, lighting of a display lamp, indication on a display, and the like, for example. Combination of them is also available. There is also available an aspect of transmitting a notification of completion of identity verification to the outside of the individual identification apparatus, such as a security guaranty company, a person living, or the like.

INDUSTRIAL APPLICABILITY

The individual identification apparatus of the present invention has a low false acceptance rate and can keep a false rejection rate low even when vein patterns or facial information changes over time, so that the same individual identification apparatus can be continuously used for many years.

REFERENCE SIGNS LIST

41 operation panel
42 speaker
43 reading unit
44 IC card insertion port
45 illumination unit
46 camera
111 input means
112 control means
113 display means
114 storage means
115 output means
121 input circuit
122 CPU
123 display
124 database
125 output circuit
126 memory
127 camera
128 reading unit
131 OS
132 finger identification data
133 facial identification data

The invention claimed is:
1. An individual identification apparatus comprising:
vein pattern identification means for reading finger vein patterns to perform identity verification based on the finger vein patterns; and
facial identification means for imaging a face with a camera to perform identity verification based on facial information,
the individual identification apparatus determining that a person is a principal when the person is identified by both the vein pattern identification means and the facial identification means,
the individual identification apparatus being configured such that a reading unit for reading the finger vein patterns and the camera for imaging the face are disposed adjacent to each other, and such that when a finger of the person is placed on the reading unit, the camera images the face of the person,
the vein pattern identification means including:
the reading unit irradiating the finger with light to read the finger vein patterns, and images light passing through the finger; and a vein identification unit having a database in which identification data on the finger vein patterns is recorded in advance, the vein identification unit being configured to be capable of receiving imaging information from the reading unit, and when receiving the imaging information from the reading unit, extracting vein patterns from the imaging information, retrieving identification data corresponding to the extracted vein patterns, and achieving identity verification when there is identification data with an agreement rate between the extracted vein patterns and the identification data on vein patterns, being equal to or more than a threshold value set lower than a threshold normally set in the vein pattern identification means, the facial identification means including:

the camera for imaging the face; and a facial identification unit having a database in which facial identification data is recorded in advance, the facial identification unit being configured to be capable of receiving imaging information from the camera, and when receiving the imaging information from the camera, extracting facial information from the imaging information, retrieving identification data corresponding to the extracted facial information, and achieving identity verification when there is identification data with an agreement rate between the extracted facial information and the identification data on the face, being equal to or more than a threshold value set lower than a threshold normally set in the facial identification means, wherein the extracted vein patterns and the extracted facial information are additionally accumulated in the database when identity verification is achieved by both of the vein pattern identification means and the facial identification means, and wherein a setting value of a threshold at a time of identification is increased when a difference between an agreement rate between the data additionally accumulated in the database and the identification data, and a set threshold, is higher to perform identity verification using the change threshold, and a setting value of a threshold at a time of identification is reduced when a difference between an agreement rate between the data additionally accumulated in the database and the identification data, and a set threshold, is lower to perform identity verification using the changed threshold.

2. The individual identification apparatus according to claim 1, wherein when the finger of the person is placed on the reading unit, a precaution for imaging is voice-guided before the camera images the face of the person.

3. The individual identification apparatus according to claim 1, further comprising an illumination unit adjacent to the camera, wherein the illumination unit emits light in an imaging direction of the camera when the finger of the person is placed on the reading unit.

4. The individual identification apparatus according to claim 1, wherein old data is deleted from the data accumulated in the database.

5. The individual identification apparatus according to claim 1, wherein updated data accumulated in the database is used as the identification data.

* * * * *